US012316045B1

(12) United States Patent
Guillot et al.

(10) Patent No.: US 12,316,045 B1
(45) Date of Patent: May 27, 2025

(54) HIGH-VOLTAGE ELECTRICAL CONNECTOR WITH LIMITED RISK OF HIGH-FREQUENCY AC ELECTRIC ARCS

(71) Applicant: Safran Electronics & Defense, Paris (FR)

(72) Inventors: François Guillot, Moissy-Cramayel (FR); Tanguy Renan, Moissy-Cramayel (FR)

(73) Assignee: Safran Electronics & Defense, Paris (FR)

( * ) Notice: Subject to any disclaimer, the term of this patent is extended or adjusted under 35 U.S.C. 154(b) by 0 days.

(21) Appl. No.: 18/869,812

(22) PCT Filed: May 22, 2023

(86) PCT No.: PCT/EP2023/063665
§ 371 (c)(1),
(2) Date: Nov. 26, 2024

(87) PCT Pub. No.: WO2023/232542
PCT Pub. Date: Dec. 7, 2023

(30) Foreign Application Priority Data

Jun. 1, 2022 (FR) ....................................... 2205268

(51) Int. Cl.
*H01R 13/53* (2006.01)
*H01R 13/03* (2006.01)
*H01R 13/52* (2006.01)

(52) U.S. Cl.
CPC ........... *H01R 13/53* (2013.01); *H01R 13/035* (2013.01); *H01R 13/5219* (2013.01)

(58) Field of Classification Search
CPC ... H01R 13/53; H01R 13/035; H01R 13/5219
(Continued)

(56) References Cited

U.S. PATENT DOCUMENTS 3,376,541 A * 4/1968 Link ...................... H01R 13/53 174/18
4,946,393 A * 8/1990 Borgstrom ............. H01R 13/53 439/190

(Continued)

FOREIGN PATENT DOCUMENTS

EP 891013 A1 * 1/1999 ............. H01R 13/53
EP 1876682 B1 2/2012

(Continued)

OTHER PUBLICATIONS

International Appl. No. PCT/EP2023/063665, International Preliminary Report on Patentability, dated Dec. 12, 2024, 7 pages.

(Continued)

*Primary Examiner* — Gary F Paumen
(74) *Attorney, Agent, or Firm* — Kilpatrick Townsend & Stockton LLP

(57) ABSTRACT

Disclosed is an electrical connector having:
- a body made from an electrically conductive material,
- at least one electrical conductor covered with a layer of electrically insulating material,
- at least one electrical terminal connected electrically to one end of the electrical conductor, and
- an insulating insert intended to electrically insulate the electrical terminal relative to the body of the electrical connector,
- the insulating insert having a first region of electrical continuity covered with a layer of electrically conductive material to provide electrical continuity with the body, and
- a second region of electrical continuity covered with a layer of electrically conductive material to provide electrical continuity with the electrical terminal,
- an elastic seal being arranged in a space in which a volume of air inside the electrical connector is liable to (Continued)

be subjected to a difference in electrical potentials between an electrical potential of the body and an electrical potential of the electrical terminal, the elastic seal being in contact with the first region of electrical continuity and with the second region of electrical continuity.

9 Claims, 4 Drawing Sheets

(58) Field of Classification Search
USPC .......................................... 439/174, 181, 886
See application file for complete search history.

(56) References Cited

U.S. PATENT DOCUMENTS 5,998,736 A * 12/1999 Rumsey ................. H01R 13/53
174/84 R
9,906,008 B2 * 2/2018 Yoshida ................. H02G 5/007

FOREIGN PATENT DOCUMENTS

EP 2887480 A1 6/2015
EP 3575804 A1 12/2019

OTHER PUBLICATIONS

International Appl. No. PCT/EP2023/063665, International Search Report, Translation of International Search Report, and Written Opinion, dated Aug. 2, 2023, 14 pages.

* cited by examiner

[Fig. 1]
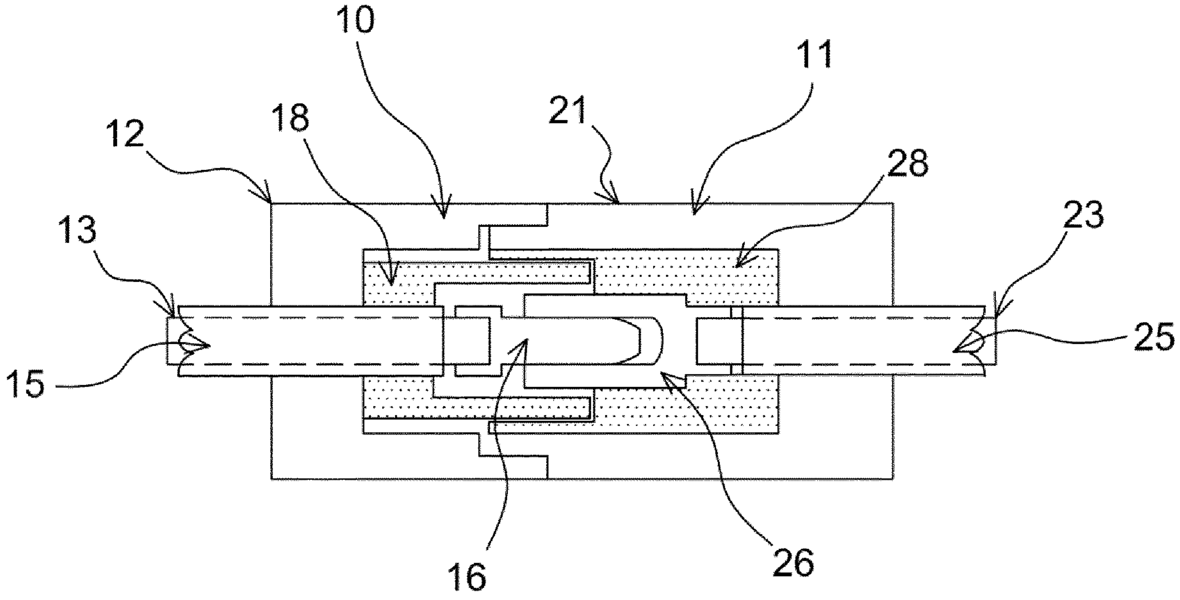
[Fig. 2]
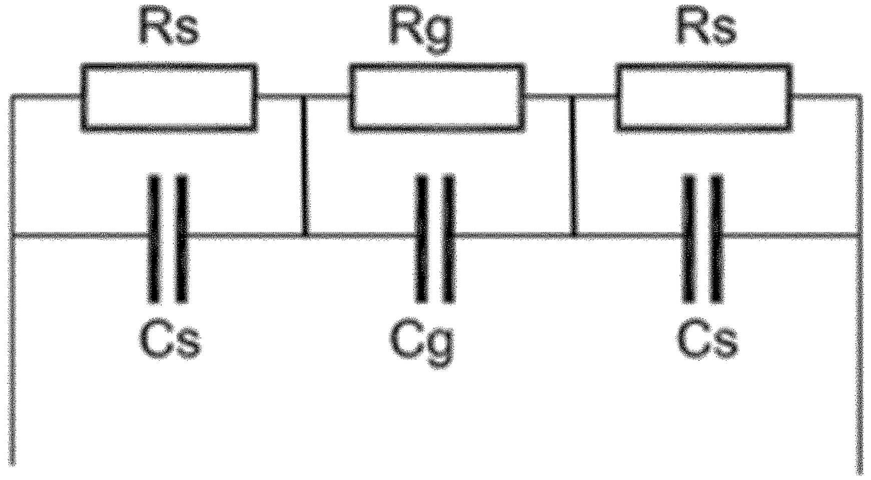

[Fig. 3]
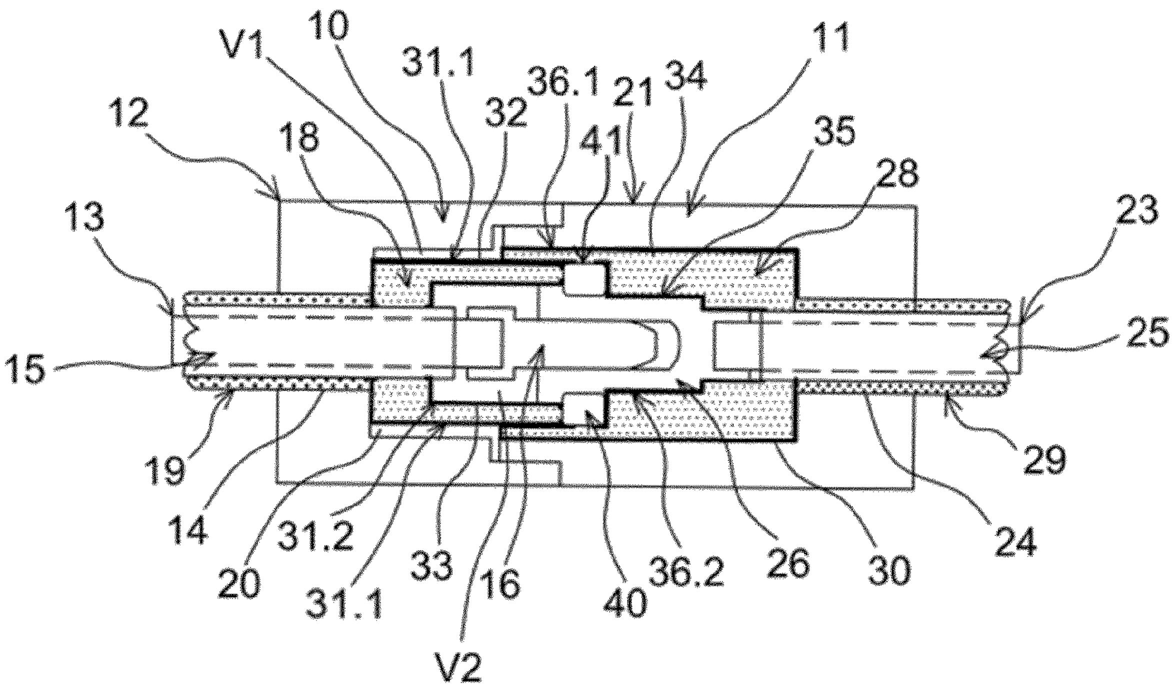
[Fig. 4a]
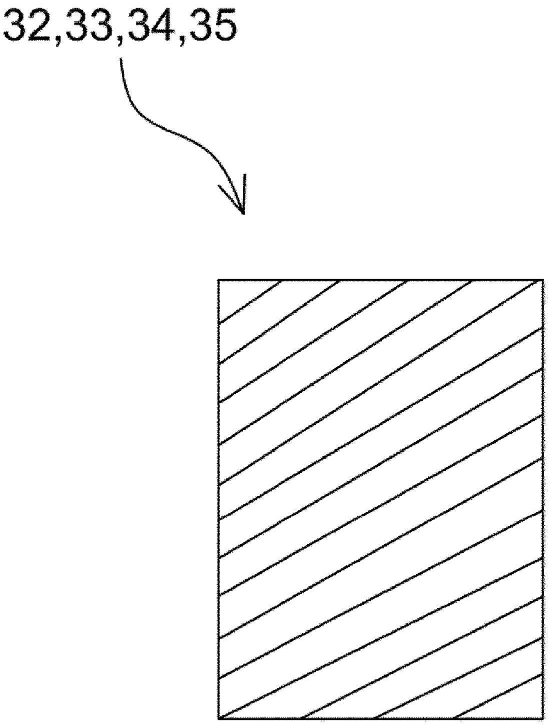

[Fig. 4b]
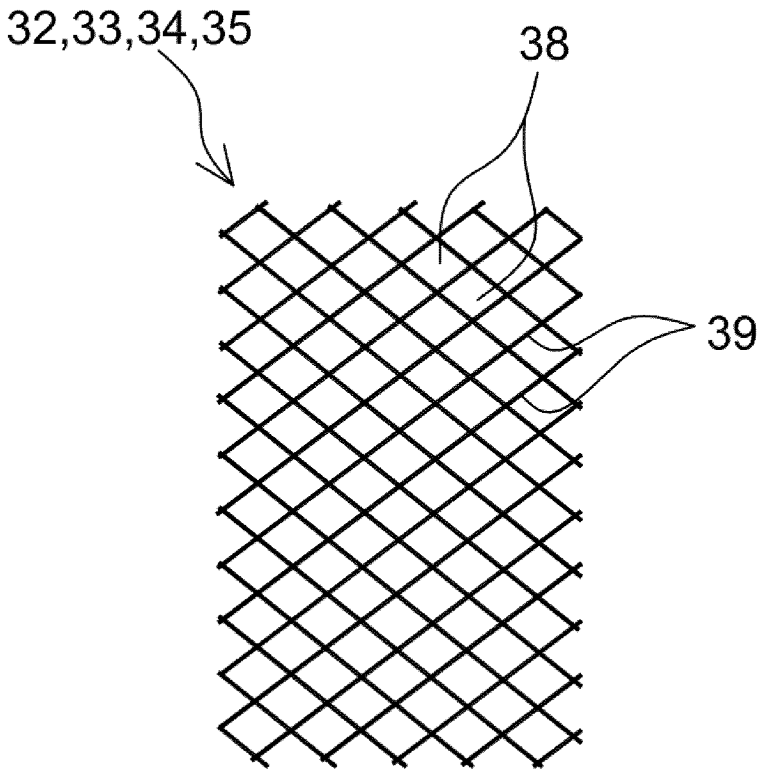
[Fig. 5]
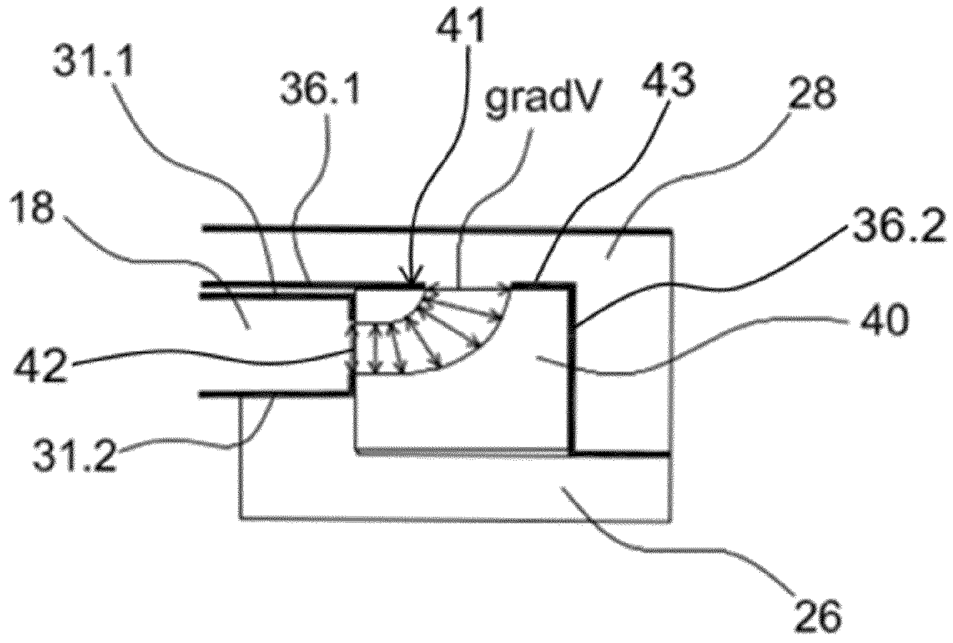

[Fig. 6a]
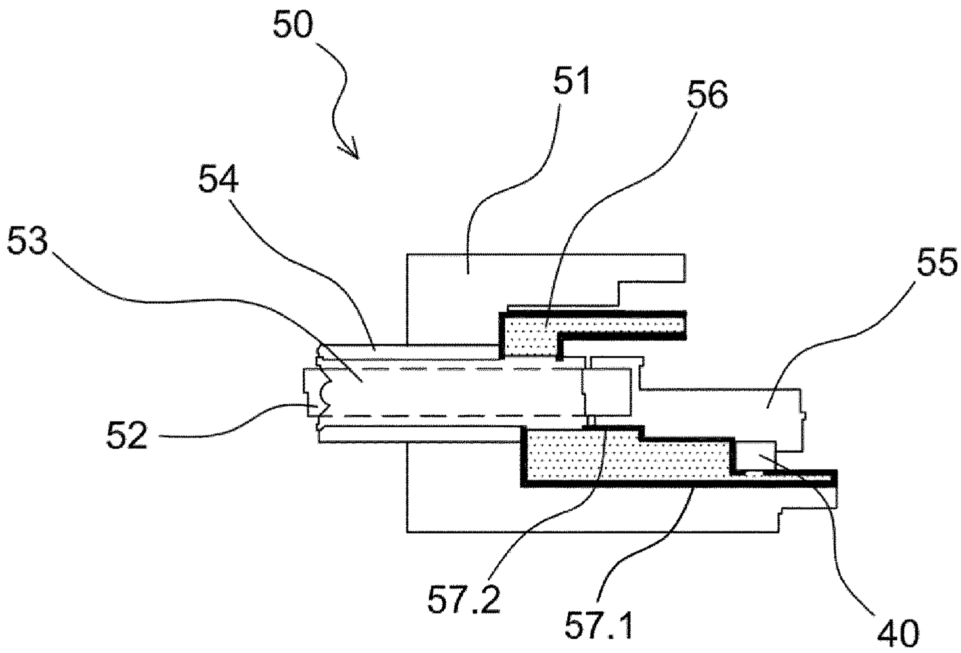
[Fig. 6b]
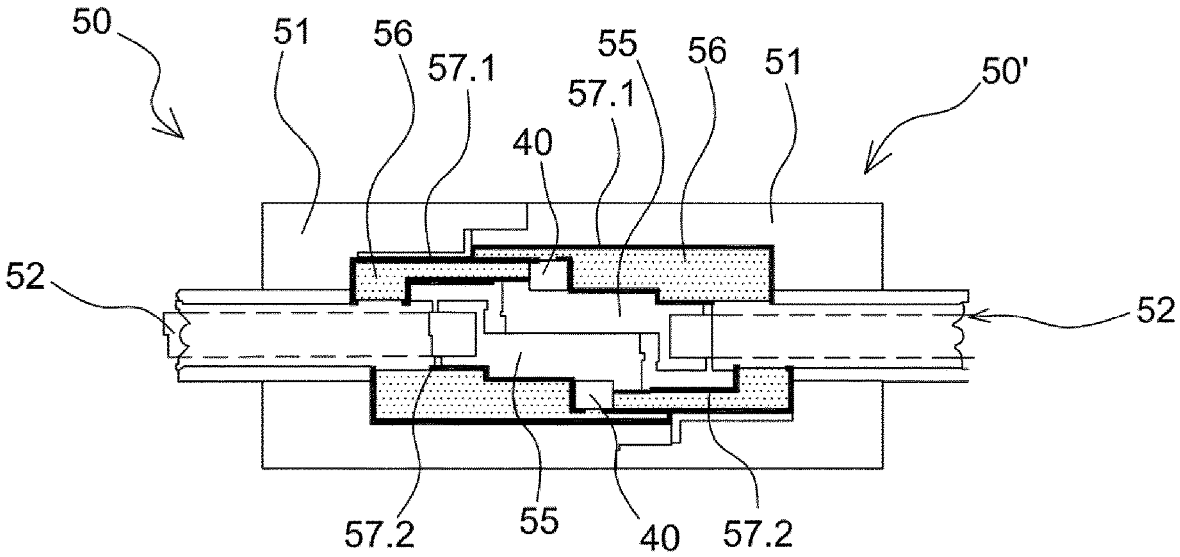

HIGH-VOLTAGE ELECTRICAL CONNECTOR WITH LIMITED RISK OF HIGH-FREQUENCY AC ELECTRIC ARCS

CROSS REFERENCE TO RELATED APPLICATIONS

This application is a U.S. national phase under 35 U.S.C. § 371 of International Patent Application No. PCT/EP2023/063665, filed on May 22, 2023, which claims priority to France Patent Application No. 2205268, filed on Jun. 1, 2022, the entire contents of both of which are incorporated herein by reference in their entireties.

The present invention relates to a high-voltage electrical connector with a limited risk of electric arcs in high-frequency alternating operation. The invention finds a particularly advantageous, but not exclusive, application with connectors used on aircraft power electrical networks.

FIG. 1 shows a schematic representation of an assembly of a male electrical connector 10 and a female electrical connector 11 used within an aircraft electrical power network according to the prior art.

The male electrical connector 10 comprises a body 12 made of an electrically conductive material, an electrical conductor 13 covered with a layer of electrically insulating material 15, a male electrical terminal 16, as well as an insulating insert 18 for electrically insulating the male electrical terminal 16 from the body 12.

The female electrical connector 11 comprises a body 21 made of an electrically conductive material, an electrical conductor 23 covered with a layer of electrically insulating material 25, a female electrical terminal 26, as well as an insulating insert 28 for electrically insulating the female electrical terminal 26 from the body 21.

The increasing electrification of aircrafts leads to increasing the electrical voltages applied to the actuation systems in order to minimize the mass thereof as well as electrical losses. The voltages implemented on the power electrical networks are of the order of 800V with a maximum DC-voltage approaching 1000V.

In order to support high voltage levels, it is known to increase the thicknesses of the solid dielectrics of electrical connectors made of a thermoplastic or thermosetting material. However, the ambient air contributes to the electrical insulation of the different equipotential zones from one another.

FIG. 2 shows an equivalent diagram of a dielectric chain between two equipotential zones, for example the electrical conductor 13, 23 and the body 12, 21 of an electrical connector 10, 11. Cs and Rs represent respectively the capacitance and the resistance of the solid dielectrics. Cg and Rg represent respectively the capacitance and the resistance of the gaseous dielectrics, such as ambient air.

In a DC (Direct Current) operation, the distribution of voltage potentials is carried out by the intrinsic resistances in insulators alone (capacitors are not involved). Furthermore, the resistivity of solid dielectrics is much higher than that of air. In practice, the voltage is very largely distributed among solid insulators dimensioned so as to withstand this voltage.

In an AC (Alternative Current) operation, the distribution of potentials is carried out mainly by the intrinsic capacitors in insulators, all the more so with respect to the resistors as the frequency is high. These capacitors are dimensioned in Farad and their value is defined by the facing surfaces, the distances between equipotential zones, the permittivity of the vacuum (ε0) and the relative permittivity of the dielectric (εr).

The value of a capacitor is given by the relation $$C=S_{\varepsilon 0 \varepsilon r}/L:$$

C being the value of the capacitor in Farad,
S being the facing surface in $m^2$,
L being the distance between the facing surfaces in m, and
ε0 being the vacuum permittivity=8,854×10−12 F/m. The relative permittivity of air is close to 1 while that of the solid dielectrics conventionally used is between 3 and 5.

In AC operation, most of the voltage variations are applied to air which has a much lower dielectric strength (20 to 50 times) than that of solid dielectrics (1 to 3 kV/mm for air and 20 kV/mm to 150 kV/mm for solid dielectrics).

Under these conditions, a phenomenon of ionization of the air is observed, which induces a risk of electric arcs. In particular, this phenomenon appears during remote power supply of polyphase motors via PWM (Pulse Width Modulation) voltage signals presenting significant voltage temporal variations (dV/dt) due to a short switching time and a high voltage. This results in a loss of electrical power as well as heat dissipation likely to deteriorate the solid dielectrics in the electrical connector.

The objective of the invention is to effectively remedy the aforementioned drawbacks by offering an electrical connector comprising:

a body made of an electrically conductive material,
at least one electrical conductor covered with a layer of electrically insulating material,
at least one electrical terminal electrically connected to one end of the electrical conductor, and
an insulating insert for electrically insulating the electrical terminal from the body of said electrical connector,
the insulating insert comprising a first electrical continuity zone covered with a layer of electrically conductive material ensuring electrical continuity with the body, and
a second electrical continuity zone covered with a layer of electrically conductive material ensuring electrical continuity with the electrical terminal,
an elastic gasket being arranged in a gap where an internal air volume of the electrical connector is likely to be subjected to a difference in electrical potentials between an electrical potential of the body and an electrical potential of the electrical terminal,
said elastic gasket being in contact with the first electrical continuity zone and with the second electrical continuity zone.

The invention thus permits to eliminate any trace of ambient air used as electrical insulation inside the connector by minimizing or even canceling the significant potential differences likely to be applied to the air inside the electrical connector. The invention thus minimizes the risk of generating electric arcs when the electrical connector is used in a high-frequency and high-voltage operation.

According to one embodiment of the invention, the elastic gasket is made of a silicone material.

According to one embodiment of the invention, the layers of electrically conductive material in the first electrical continuity zone and the second electrical continuity zone are solid layers.

According to one embodiment of the invention, the layers of electrically conductive material in the first electrical continuity zone and the second electrical continuity zone are mesh layers.

According to one embodiment of the invention, the layers of electrically conductive material in the first electrical continuity zone and the second electrical continuity zone are made of carbon.

According to one embodiment of the invention, the layers of electrically conductive material in the first electrical continuity zone and the second electrical continuity zone are made of metal.

According to one embodiment of the invention, the layers of electrically conductive material in the first electrical continuity zone and the second electrical continuity zone each have a thickness between 20 nm and 100 nm.

According to one embodiment of the invention, the electrical conductor and the layer of electrically insulating material are covered by a shield.

According to one embodiment of the invention, said electrical connector is of male and/or female type.

The invention also relates to an assembly of two connectors.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein:

FIG. 1, already described, is a schematic representation of the assembly of a male electrical connector and a female electrical connector according to the prior art;

FIG. 2, already described, shows an equivalent diagram of a dielectric chain between two equipotential zones in an electrical connector according to the prior art;

FIG. 3 is a schematic representation of the assembly of a male electrical connector and a female electrical connector according to the invention;

FIGS. 4*a* and 4*b* show top views of a layer of electrically conductive material on an insulating insert having a solid configuration and a mesh configuration, respectively;

FIG. 5 is a schematic representation of the distribution of a voltage gradient inside an elastic gasket of an electrical connector according to the invention;

FIG. 6*a* is a schematic representation of a hermaphroditic type electrical connector according to the invention;

FIG. 6*b* is a schematic representation of the assembly of two hermaphroditic electrical connectors according to the invention.

It should be noted that common structural and/or functional elements for the different embodiments have the same references. Thus, unless otherwise stated, such elements have identical structural, dimensional and material properties.

FIG. 3 shows a male electrical connector 10 establishing an electrical contact with a female electrical connector 11. The electrical connectors 10 and 11 may be used for example in a high voltage electrical network in an aircraft.

The male electrical connector 10 comprises a body 12 made of an electrically conductive material and provided with at least one conductor passage opening 14. The body 12 of the male electrical connector 10 has a shape complementary to that of a body 21 of the female electrical connector 11. At least one electrical conductor 13 is inserted into the conductor passage opening 14. The electrical conductor 13 may be made of an electrically conductive material, such as copper, aluminum, or any other electrically conductive material suitable for the application. The electrical conductor 13 may be covered, if needed, with a thin finishing layer for improving its electrical conductivity, such as for example a layer of palladium, gold, silver, tin, nickel or any other electrically conductive material suitable for the application.

The electrical conductor 13 may consist of a single wire having a round section, a flat surface, or any other form adapted to the application. Alternatively, the electrical conductor 13 may be of the multi-strand type, i.e. it may consist of a plurality of wires arranged side by side. The electrical conductor 13 is covered by a layer of electrically insulating material 15. The electrically insulating material of the layer 15 may consist of a dielectric sheath covering the electrical conductor 13 or possibly a layer of enamel.

The electrical conductor 13 and the layer of electrically insulating material 15 are covered by a shield 19. The shield 19 is made of an electrically conductive material. The shield 19 is electrically connected to the body 12 of the male electrical connector 10.

At least one male electrical terminal 16 is electrically connected to one end of the electrical conductor 13. The connection between the male electrical terminal 16 and the electrical conductor 13 may be made by crimping, welding (with or without adding material), or any other electrical connection technique adapted to the application. The male electrical terminal 16 has a shape complementary to that of the female electrical terminal 26.

An insulating insert 18 is provided for electrically insulating the male electrical terminal 16 from the body 12 of the electrical connector 10. The insulating insert 18 also has a function of electrically holding the male electrical terminal 16. The insulating insert 18 is arranged inside a housing 20 in the body 12. The insulating insert 18 extends at least partly around the male electrical terminal 16. The insulating insert 18 has a shape cooperating with a complementary shape of the insulating insert 28 of the female electrical connector 11. The insulating insert 18 may be made of any rigid dielectric material, such as a thermoplastic material or a thermosetting material.

The insulating insert 18 comprises a first electrical continuity zone 31.1 covered with a layer of electrically conductive material 32 ensuring electrical continuity with the body 12 of the electrical connector, and a second electrical continuity zone 31.2 covered with a layer of electrically conductive material 33 ensuring electrical continuity with the male electrical terminal 16.

The first electrical continuity zone 31.1 and the second electrical continuity zone 31.2 are distinct from each other, i.e. there is no material continuity between the layer 32 of electrically conductive material of the first electrical continuity zone 31.1 and the layer of electrically conductive material 33 of the second electrical continuity zone 31.2.

Furthermore, the female electrical connector 11 comprises a body 21 made of an electrically conductive material and provided with at least one conductor passage opening 24. The body 21 of the female electrical connector 11 has a shape complementary to that of the body 12 of the male electrical connector 10. At least one electrical conductor 23 is inserted into the conductor passage opening 24. The electrical conductor 23 may be made of an electrically conductive material, such as copper, aluminum, or any other electrically conductive material suitable for the application. The electrical conductor 23 may be covered, if needed, with a thin finishing layer for improving its electrical conductivity, such as for example a layer of palladium, gold, silver, tin, nickel or any other electrically conductive material suitable for the application.

The electrical conductor 23 may consist of a single wire having a round section, a flat surface, or any other shape suitable for the application. Alternatively, the conductor may be of the multi-strand type, i.e. it may consist of a plurality of wires arranged side by side. The electrical conductor 23 is covered with a layer 25 of electrically insulating material. The electrically insulating material of the layer 25 may consist of a dielectric sheath covering the electrical conductor 23 or possibly a layer of enamel.

The electrical conductor 23 and the layer 25 of electrically insulating material are covered by a shield 29. The shield 29 is made of an electrically conductive material. The shield 29 is electrically connected to the body 21 of the female electrical connector 11.

At least one female electrical terminal 26 is electrically connected to one end of the electrical conductor 23. The connection between the female electrical terminal 26 and the electrical conductor 23 may be made by crimping, welding (with or without adding material), or any other electrical connection technique adapted to the application. The female electrical terminal 26 has a shape complementary to that of the male electrical terminal 16.

An insulating insert 28 is provided for electrically insulating the female electrical terminal 26 from the body 21 of the electrical connector 11. The insulating insert 28 also has a function of electrically holding the female electrical terminal 26 of the electrical connector 11. The insulating insert 28 is arranged inside a housing 30 in the body 21. The insulating insert 28 extends at least partly around the female electrical terminal 26. The insulating insert 28 has a shape cooperating with a complementary shape of the insulating insert 18 in the male electrical connector 10. The insulating insert 28 may be made of any rigid dielectric material, such as a thermoplastic material or a thermosetting material.

The insulating insert 28 comprises a first electrical continuity zone 36.1 covered with a layer of electrically conductive material 34 ensuring electrical continuity with the body 21 of the electrical connector 11, and a second electrical continuity zone 36.2 covered electrically conductive material 35 ensuring electrical continuity with the female electrical terminal 26.

The first electrical continuity zone 36.1 and the second electrical continuity zone 36.2 are distinct from each other, i.e. there is no material continuity between the layer 34 of electrically conductive material of the first electrical continuity zone 36.1 and the layer 35 of electrically conductive material of the second electrical continuity zone 36.2.

When the male and female electrical connectors (10 resp. 11) are assembled together, there is an electrical continuity between the first electrical continuity zone 31.1 of the male electrical connector 10 and the first electrical continuity zone 36.1 of the female electrical connector 11. There may also be an electrical continuity between the second electrical continuity zone 31.2 of the male electrical connector 10 and the second electrical continuity zone 36.2 of the female electrical connector 11.

Thus, the air volume V1 extending radially between an external face of the insulating insert 18 and an internal face of the body 12 is subjected on both sides to the electrical potential of the bodies 12, 21 of the electrical connectors 10, 11, which prevents parasitic currents from occurring in high-voltage alternating operation in this area. Similarly, the air volume V2 is subjected on both sides to the electrical potential of the electrical terminals 16, 26 of the electrical connectors 10, 11, which prevents parasitic currents from occurring in high-voltage alternating operation in this area.

As illustrated in FIG. 4*a*, the layers 32, 33, 34, 35 of electrically conductive material of the first electrical continuity zone 31.1, 36.1 and of the second electrical continuity zone 31.2, 36.2 may be solid layers.

Alternatively, as illustrated in FIG. 4*b*, the layers 32, 33, 34, 35 of electrically conductive material of the first electrical continuity zone 31.1, 36.1 and the second electrical continuity zone 31.2, 36.2 may be mesh layers. The mesh layers comprise an alternation of empty zones 38, i.e. zones without any electrically conductive material, and arms 39 delimiting the meshes of the layer.

The layers 32, 33, 34, 35 of electrically conductive material of the first electrical continuity zone 31.1, 36.1 and the second electrical continuity zone 31.2, 36.2 are preferably made of carbon. Alternatively, the layers 32, 33, 34, 35 are made of metal.

The layers 32, 33, 34, 35 of electrically conductive material may be deposited by ultrasonic welding, plasma deposition, or any other technique for depositing a thin layer of electrically conductive material onto an element made of a dielectric material. The type of electrically conductive material is chosen according to its compatibility with the material of the insulating insert 18, 28 onto which the layer 32, 33, 34, 35 is deposited.

The layers 32, 33, 34, 35 of electrically conductive material of the first electrical continuity zone 31.1 and the second electrical continuity zone 31.2 each have a thickness between 20 nm and 100 nm.

An elastic gasket 40 visible in FIG. 3 is arranged in a gap 41 where an internal air volume of the electrical connector is likely to be subjected to a difference in electrical potentials between an electrical potential of the body 12, 21 and an electrical potential of the electrical terminal 16, 26. The elastic gasket 40 is arranged between the male electrical connector 10 and the female electrical connector 11. The gap 41 extends axially between the insulating insert 18 of the connector 10 and the insulating insert 28 of the connector 11. The gap 41 extends radially between one of the electrical terminals 16 or 26 and one of the insulators 18 or 28.

The elastic gasket 40 is made of a material capable of supporting the maximum internal voltage the electrical connector is subjected to. The elastic gasket 40 is preferably made of silicone but any other material suitable for the application is possible. When the connectors 10 and 11 are assembled together, the elastic gasket 40 is compressed so as to expel the air inside the gap 41. The air is thus replaced with the elastic gasket 40 as electrical insulator. The elastic gasket 40 thus permits to significantly increase the dielectric strength relative to air by a ratio of at least 10.

As can be seen more precisely in FIG. 5, the gasket 40 is in contact with the first electrical continuity zone 31.1 and the second electrical continuity zone 31.2 of the electrical connector 10, in particular one end of the first electrical continuity zone 31.1 and one end of the second electrical continuity zone 31.2 of the electrical connector 10. The gasket 40 is also in contact with the first electrical continuity zone 36.1 and the second electrical continuity zone 36.2 of the electrical connector 11, in particular one end of the first electrical continuity zone 36.1 and one end of the second electrical continuity zone 36.2 of the electrical connector 11.

On a first face 42 of the gap 41 delimiting the air volume, the end of the first electrical continuity zone 31.1 and the end of the second electrical continuity zone 31.2 of the electrical connector 10 are kept away from one another by a distance, for example of the order of a millimeter.

On a second face 43 of the gap 41 delimiting the air volume, the end of the first electrical continuity zone 36.1 and the end of the second electrical continuity zone 36.2 of the electrical connector 11 are kept away from one another by a distance, for example of the order of a millimeter.

In the example it is shown the first face 42 and the second face 43 of the gap 41 where the electrical continuity zones end are adjacent to each other. Alternatively, the first face 42 and the second face 43 may be opposite each other.

Thus, the voltage gradient gradV between the electrical potential of the terminals and the electrical potential of the body 12, 21 is distributed inside the elastic gasket 40.

FIG. 6*a* shows an example of implementation of the invention with an electrical connector 50 of the hermaphroditic type, i.e. a connector which is the combination of a male connector and a female connector. This type of connector is used for economies of scale or when the assembly operation on equipment (harness or housing) is irreversible in order to avoid assembly errors.

More specifically, the electrical connector 50 comprises a body 51 made of an electrically conductive material, an electrical conductor 52 covered with a layer 53 of electrically insulating material and a shield 54 electrically connected to the body 51. The connector 50 also comprises an electrical terminal 55 having a male portion and a female portion, as well as an insulating insert 56 for electrically insulating the electrical terminal 55 from the body 51.

Similarly to the previous embodiments, the insulating insert 56 comprises a first electrical continuity zone 57.1 covered with a layer of electrically conductive material ensuring electrical continuity with the body 51, and a second electrical continuity zone 57.2 covered with layer of electrically conductive material ensuring electrical continuity with the electrical terminal 55.

The first electrical continuity zone 57.1 and the second electrical continuity zone 57.2 are distinct from each other, i.e. there is no material continuity between the layer of electrically conductive material of the first electrical continuity zone 57.1 and the layer of electrically conductive material of the second electrical continuity zone 57.2.

As illustrated in FIG. 6*b*, when two hermaphroditic electrical connectors 50 and 50' are assembled together, the male portion of the electrical terminal 55 of the connector 50 cooperates with the female portion of the electrical terminal 55 of the connector 50' while the female portion of the electrical terminal 55 of the connector 50 cooperates with the male portion of the electrical terminal 55 of the connector 50'.

There is an electrical continuity between the first electrical continuity zone 57.1 of the electrical connector 50 and the first electrical continuity zone 57.1 of the electrical connector 50'. There is also an electrical continuity between the second electrical continuity zone 57.2 of the electrical connector 50 and the second electrical continuity zone 57.2 of the electrical connector 50'.

Alternatively, the electrical connector 10, 11, 50 is a multi-pin connector comprising two or more electrical terminals 16, 26, 55. In this case, an electrical continuity zone is provided for each electrical terminal 16, 26, 55 of the electrical connector 10, 11.

Of course, the different characteristics, variants and/or embodiments of the present invention can be associated with each other in various combinations insofar as they are not incompatible with or exclusive of one another. Furthermore, the invention is not limited to the embodiments described above and provided solely by way of example. It encompasses various modifications, alternative forms and other variants which a person skilled in the art may envisage in the context of the present invention and in particular any combination of the various operating modes described above may be taken separately or in combination.

The invention claimed is:

1. An electrical connector comprising:

a body made of an electrically conductive material;

at least one electrical conductor covered with a layer of electrically insulating material;

at least one electrical terminal electrically connected to one end of the electrical conductor; and an insulating insert for electrically insulating the electrical terminal from the body of said electrical connector, wherein the insulating insert comprises a first electrical continuity zone covered with a layer of electrically conductive material ensuring an electrical continuity with the body; and a second electrical continuity zone covered with a layer of electrically conductive material ensuring electrical continuity with the electrical terminal;

an elastic gasket being arranged in a gap where an internal air volume of the electrical connector is likely to be subjected to a difference in electrical potentials between an electrical potential of the body and an electrical potential of the electrical terminal, said elastic gasket being in contact with the first electrical continuity zone and the second electrical continuity zone.

2. The electrical connector according to claim 1, wherein the elastic gasket is made of a silicone material.

3. The electrical connector according to claim 1, wherein the layers of electrically conductive material of the first electrical continuity zone and the second electrical continuity zone are solid layers.

4. The electrical connector according to claim 1, wherein the layers of electrically conductive material of the first electrical continuity zone and the second electrical continuity zone are mesh layers.

5. The electrical connector according to claim 1, wherein the layers of electrically conductive material of the first electrical continuity zone and the second electrical continuity zone are made of carbon.

6. The electrical connector according to claim 1, wherein the layers of electrically conductive material of the first electrical continuity zone and the second electrical continuity zone are made of metal.

7. The electrical connector according to any of the claim 1, wherein the layers of electrically conductive material of the first electrical continuity zone and the second electrical continuity zone each have a thickness between 20 nm and 100 nm.

8. The electrical connector according to claim 1, wherein the electrical conductor and the layer of electrically insulating material are covered by a shield.

9. The electrical connector according claim 1, wherein it is of the male and/or female type.

* * * * *